(12) United States Patent
Smith, Jr. et al.

(10) Patent No.: US 8,971,217 B2
(45) Date of Patent: Mar. 3, 2015

(54) TRANSMITTING PACKET-BASED DATA ITEMS

(75) Inventors: Leonard Smith, Jr., Seattle, WA (US); David Milstein, Redmond, WA (US); Linda Criddle, Kirkland, WA (US); Michael D. Malueg, Renton, WA (US); Philip A. Chou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1507 days.

(21) Appl. No.: 11/480,761

(22) Filed: Jun. 30, 2006

(65) Prior Publication Data
US 2008/0002667 A1 Jan. 3, 2008

(51) Int. Cl.
*H04L 12/16* (2006.01)
*H04L 12/66* (2006.01)
*H04L 12/801* (2013.01)
*H04L 12/825* (2013.01)
*H04L 29/06* (2006.01)

(52) U.S. Cl.
CPC .............. *H04L 47/10* (2013.01); *H04L 47/263* (2013.01); *H04L 47/35* (2013.01); *H04L 65/1096* (2013.01); *H04L 65/60* (2013.01); *H04L 65/607* (2013.01)
USPC .......... 370/260; 370/356; 379/93.24; 704/200

(58) Field of Classification Search
USPC .................. 704/200, 231, 246; 379/93.24; 370/352–356, 260
See application file for complete search history.

(56) References Cited

U.S. PATENT DOCUMENTS

| | | | |
|---|---|---|---|
| 5,602,962 A | 2/1997 | Kellermann | |
| 6,463,413 B1 | 10/2002 | Applebaum et al. | |
| 6,618,701 B2 | 9/2003 | Piket et al. | |
| 6,683,938 B1 | 1/2004 | Henderson | 379/67.1 |
| 6,718,366 B2 | 4/2004 | Johnstone et al. | 709/204 |
| 6,823,312 B2 | 11/2004 | Mittal et al. | |
| 6,910,011 B1 | 6/2005 | Zakarauskas | |

(Continued)

FOREIGN PATENT DOCUMENTS

| | | |
|---|---|---|
| JP | 2002-044285 | 2/2002 |
| JP | 2002-247537 | 8/2002 |

(Continued)

OTHER PUBLICATIONS

Office Action mailed May 26, 2010, in U.S. Appl. No. 11/444,600, 20 pgs.

(Continued)

*Primary Examiner* — Melanie Jagannathan
(74) *Attorney, Agent, or Firm* — John Jardine; Kate Drakos; Micky Minhas

(57) ABSTRACT

Aspects of the present invention are directed at sending a data item from a sending client to a receiving client. In accordance with one embodiment, a method provides controls for generating an audio-based command to send a data item from a sending client to a receiving client. More specifically, the method includes receiving an audio stream at the sending client from a sending party. As the audio stream is being received, a determination is made regarding whether a command to send a data item to the receiving client was received. If a command to send a data item is included in the audio stream, the method identifies the data item that is the object of the command and then transmits the data item to the receiving client over the network.

20 Claims, 14 Drawing Sheets

(56) References Cited

U.S. PATENT DOCUMENTS

| | | | |
|---|---|---|---|
| 7,373,297 B2 | 5/2008 | Habermas et al. | |
| 7,519,536 B2 | 4/2009 | Maes et al. | |
| 7,584,510 B2 | 9/2009 | Katoh et al. | 726/29 |
| 7,720,681 B2 | 5/2010 | Milstein et al. | |
| 2002/0035474 A1 | 3/2002 | Alpdemir | 704/270 |
| 2002/0085696 A1 | 7/2002 | Martin et al. | 379/201.03 |
| 2002/0138274 A1 | 9/2002 | Sharma et al. | |
| 2003/0023730 A1 | 1/2003 | Wengrovitz | |
| 2004/0002858 A1 | 1/2004 | Attias et al. | |
| 2004/0100993 A1 | 5/2004 | Bouwen | |
| 2004/0181584 A1* | 9/2004 | Rosen et al. | 709/206 |
| 2004/0223606 A1* | 11/2004 | Enete et al. | 379/900 |
| 2004/0249884 A1* | 12/2004 | Caspi et al. | 709/204 |
| 2005/0015252 A1 | 1/2005 | Marumoto | |
| 2005/0021826 A1 | 1/2005 | Kumar | 709/232 |
| 2005/0095981 A1* | 5/2005 | Benco | 455/3.06 |
| 2005/0182626 A1 | 8/2005 | Kim et al. | |
| 2005/0271189 A1 | 12/2005 | Starbuck | 379/88.19 |
| 2006/0047518 A1 | 3/2006 | Claudatos et al. | 704/275 |
| 2006/0058999 A1 | 3/2006 | Barker et al. | |
| 2006/0130152 A1 | 6/2006 | Katoh et al. | 726/29 |
| 2006/0136203 A1 | 6/2006 | Ichikawa | |
| 2006/0178159 A1* | 8/2006 | Timms et al. | 455/518 |
| 2007/0050481 A1 | 3/2007 | Rigole | 709/219 |
| 2007/0060173 A1* | 3/2007 | Ramer et al. | 455/456.3 |
| 2007/0237149 A1 | 10/2007 | Milstein et al. | 370/392 |
| 2007/0280254 A1 | 12/2007 | Milstein et al. | 370/352 |
| 2010/0023582 A1 | 1/2010 | Pedersen et al. | 709/203 |

FOREIGN PATENT DOCUMENTS

| | | |
|---|---|---|
| JP | 2003-158729 | 5/2003 |
| JP | 2004-274464 | 9/2004 |
| JP | 2005-142873 | 6/2005 |
| JP | 2005-252668 | 9/2005 |

OTHER PUBLICATIONS

Amendment filed Aug. 24, 2010, in U.S. Appl. No. 11/444,600, 9 pgs.
Amendment filed Feb. 14, 2011, in U.S. Appl. No. 11/444,600, 9 pgs.
Office Action mailed Nov. 11, 2010, in U.S. Application No. 11/444,600 (14917.0904us01), 28 pgs. 27488 Patent Trademark Office.
Office Action mailed Apr. 13, 2011, in U.S. Appl. No. 11/444,600, 29 pgs.
Amendment filed Jul. 13, 2011, in U.S. Appl. No. 11/444,600, 9 pgs.
Office Action mailed Feb. 22, 2011, in RU Application No. 2008147111, w/Translation.
Office Action mailed Oct. 3, 2011, in U.S. Appl. No. 11/444,600, 24 pgs.
Office Action mailed Jan. 6, 2012, in JP Application No. 2009-513154, w/Translation.
Amendment filed Mar. 5, 2012, in U.S. Appl. No. 11/444,600.
Office Action mailed Nov. 8, 2012, in U.S. Appl. No. 11/444,600.
Office Action mailed Oct. 1, 2008, in U.S. Appl. No. 11/387,493, 10 pgs.
Office Action mailed May 20, 2009, in U.S. Appl. No. 11/387,493, 13 pgs.
Office Action mailed Sep. 15, 2009, in U.S. Appl. No. 11/387,493, 9 pgs.
Amendment filed Mar. 2, 2009, in U.S. Appl. No. 11/387,493, 16 pgs.
Amendment filed Aug. 20, 2009, in U.S. Appl. No. 11/387,493, 9 pgs.
Amendment filed Dec. 15, 2009, in U.S. Appl. No. 11/387,493, 8 pgs.

* cited by examiner

TRANSMITTING PACKET-BASED DATA ITEMS

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. In this regard, devices used in traditional telephony technology that may be adapted for use in an IP data network are limited and may not have controls for accessing enhanced calling features. It would be beneficial to have a device adapted for use in an IP data network configured with controls designed to access enhanced calling features.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at transmitting a data item from a sending client to a receiving client over an IP data network. In accordance with one embodiment, a method provides controls for generating an audio-based command to send a data item from a sending client to a receiving client. More specifically, the method includes receiving an audio stream at the sending client from a sending party. As the audio stream is being received, a determination is made regarding whether a command to send a data item to the receiving client was generated. If a command to send a data item is included in the audio stream, the method identifies the data item that is the object of the command and then transmits the data item to the receiving client over the network. As a result, users of the network may send data items to each other concurrently or independently of a call.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Aspects of the present invention are directed at a software system for transmitting a data item from a sending client to a receiving client. For example, a data item may be transmitted over a communication channel concurrently with call data to enhance the ways in which parties to the call are able to communicate. Although the present invention will be described in connection with an IP data network, it is equally applicable to any type of digital data exchange capable of transmitting audio. Accordingly, the disclosed embodiments and examples are illustrative in nature and should not be construed as limiting.

Figure 1:
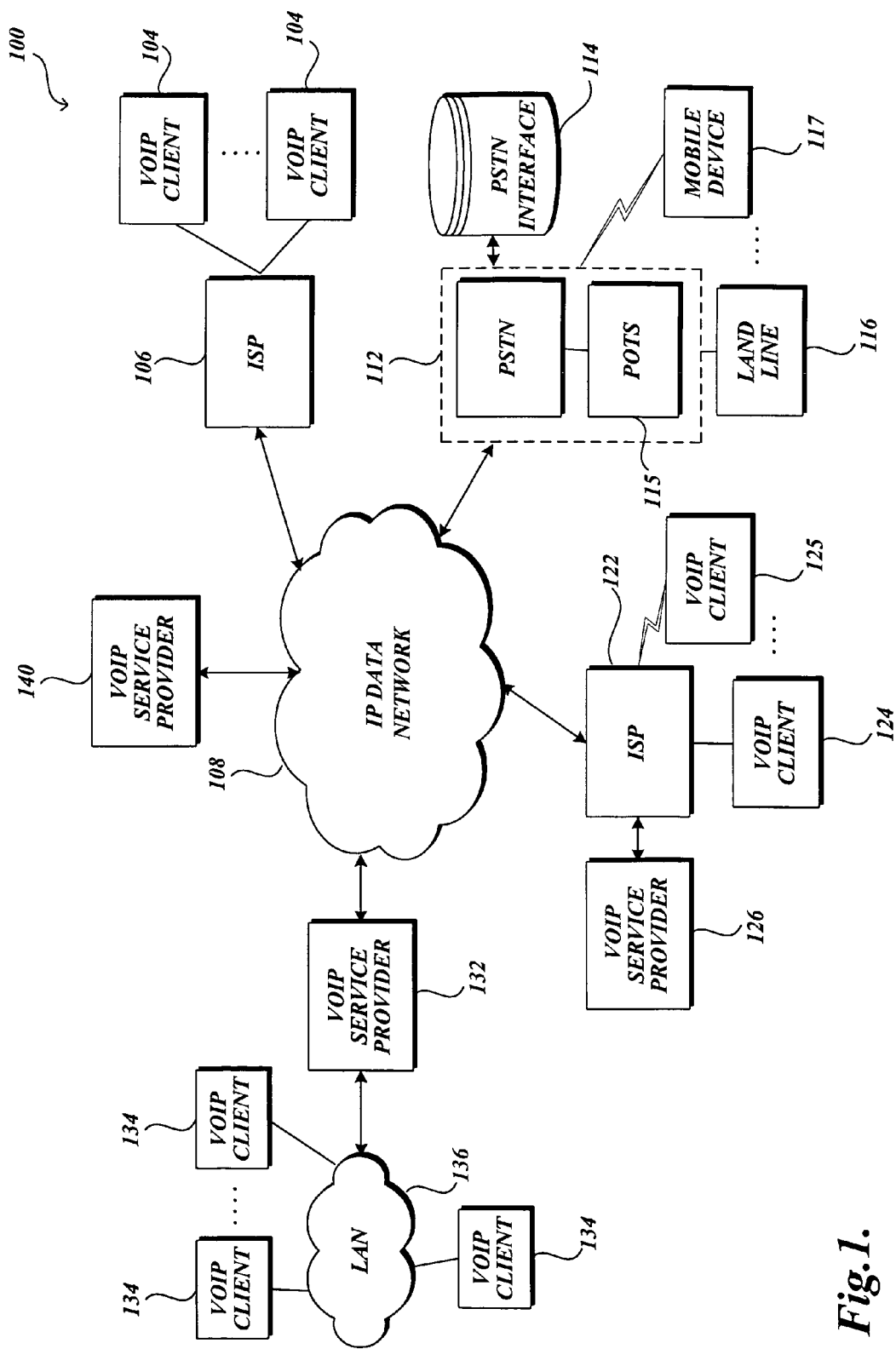
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client" or a "client" as used herein refers to a particular contact point, such as an individual, an organization, applications ("BOT"), gadget, or agent, a company, etc., with one or more associated VoIP devices and a unique VoIP client identifier. For example, a single individual, five associated VoIP devices and a unique VoIP client identifier may collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live where each individual is associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP or other data exchange services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company). Moreover, the contextual information may include data items such as electronic documents, graphical representations, program instructions and/or data items that include procedure calls for accessing functionality available from a client device.

The IP telephony environment 100 may also include third party VoIP service provider 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to rules and preferences for receiving data items and exposing functionality provided from the client device. In addition, the VoIP service providers 126, 132, 140 may also generate, maintain, and provide a separated set of metadata information of various preferences that depend on the individual(s) in which a call connection has been established.

VoIP service provider 132 may be coupled to a private network such as a company LAN 136, providing IP telephone services (e.g., internal calls within the private network, external calls outside of the private network, and the like), and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for VoIP clients 124, 125 of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 via PSTN 112. A PSTN interface 114 such as a PSTN gateway may provide access between POTS/PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client and an appropriate VoIP device associated with the VoIP client will be selected to establish a call connection with the conventional voice devices. In one example, an individual associated with the VoIP client may specify which devices are to be used in connecting a call based on a variety of conditions (e.g., connection based on the calling party, the time of day, etc.). Moreover, the individual may identify which types of data items may be transmitted on a conversation channel given the device that is being used. For example, restrictions may be established so that memory intensive data items (e.g., images, video, etc.) are not directly transmitted to a client device that utilizes a limited bandwidth connection (e.g., the mobile device 117).

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
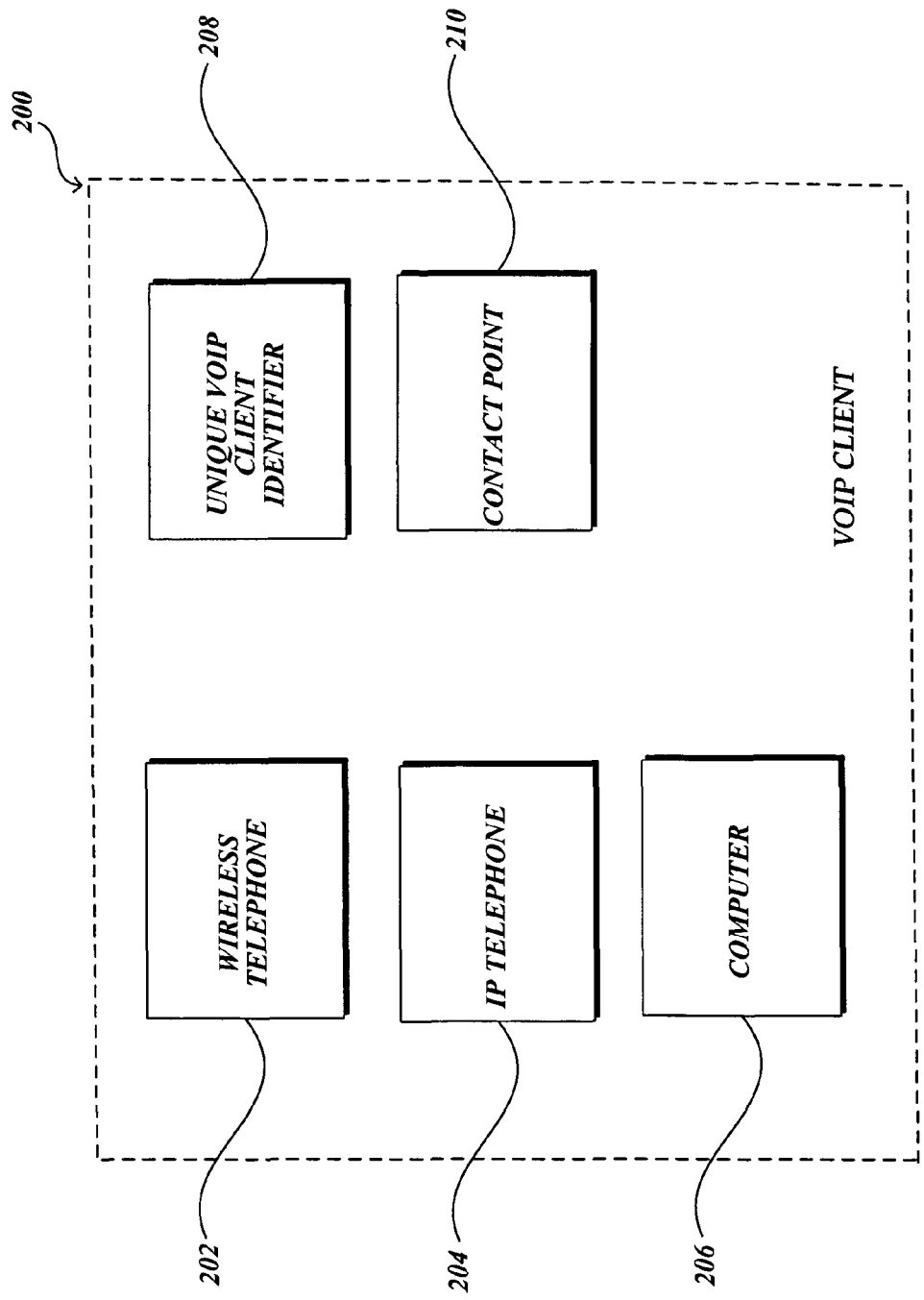
FIG. 2 is a block diagram illustrative of a VoIP client in accordance with an aspect of the present invention.

Referring now to FIG. 2, a block diagram illustrating an exemplary VoIP client 200 is illustrated that includes several VoIP devices and a Unique VoIP Client Identifier 208. Each VoIP device 202, 204, 206 may include a storage that is used to maintain voice messages, address books, client specified rules, restrictions and preferences on receiving data items, and/or rules for exposing functionality available from the client device. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless telephone 202, an IP phone 204, or a computer 206 with proper VoIP applications may be part of the VoIP client 200. The VoIP client 200 also maintains a Unique VoIP Client Identifier 208. The Unique VoIP Client Identifier 208 may be constant or change over time. For example, the Unique VoIP Client Identifier 208 may change with each call. The Unique VoIP Client Identifier 208 is used to identify the client and to connect with the contact point 210 associated with the VoIP client. The Unique VoIP Client Identifier 208 may be maintained on each VoIP device included in the VoIP client and/or maintained by a service provider that includes an association with each VoIP device included in the VoIP client. In the instance in which the Unique VoIP Client Identifier 208 is maintained by a service provider, the service provider may include information about each associated VoIP device and knowledge as to which device(s) to connect for incoming communications. In an alternative embodiment, the VoIP client 200 may maintain multiple client identifiers. In this embodiment, the Unique VoIP Client. Identifier 208 may be temporarily assigned to the VoIP client 200 for each call session.

The Unique VoIP Client Identifier 208 may be used similar to a telephone number in PSTN. However, instead of dialing a typical telephone number to ring a specific PSTN device, such as a home phone, the Unique VoIP Client Identifier 208 is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3A:
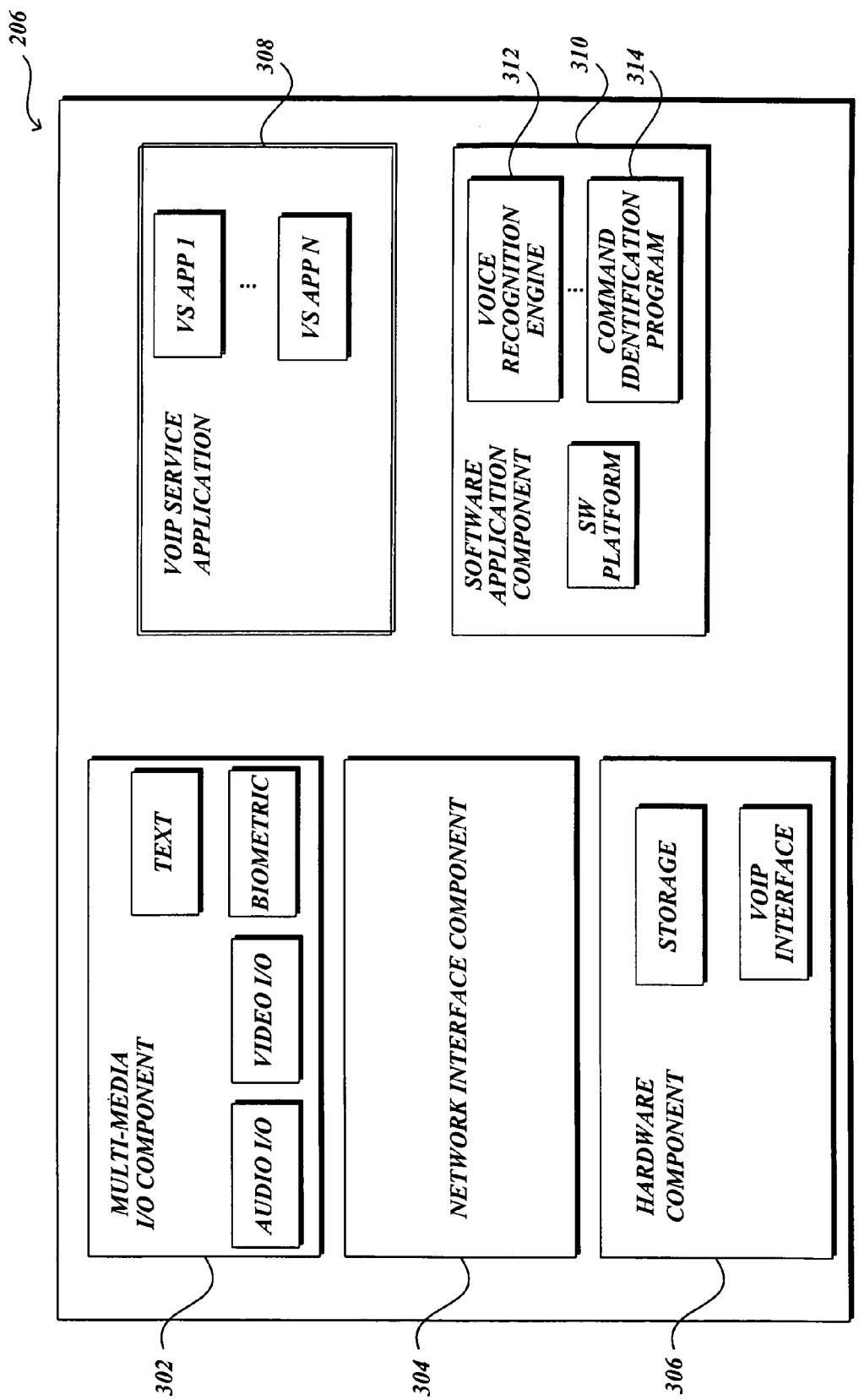
FIG. 3A is a block diagram illustrative of various components associated with a VoIP device in accordance with an aspect of the present invention.

FIG. 3A is a block diagram of a VoIP device, namely the computer 206 (FIG. 2) that may be associated with one or more VoIP clients. It is to be noted that the computer 206 is described as an example and any suitable device with various other components can be used with embodiments of the present invention. For utilizing VoIP services, the computer 206 may include components suitable for receiving, transmitting, and processing various types of data packets. For example, the computer 206 may include a multimedia input/output component 302 and a network interface component 304. The multimedia input/output component 302 may be configured to input and/or output multimedia data (including audio, video, and the like), text, application file data, etc. The multimedia input/output component 302 may include any suitable user input/output components such as a microphone, a video camera, a display screen, a keyboard, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The computer 206 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals such as a voice profile. In one embodiment, the hardware component 306 may include a VoIP interface card which allows non-VoIP client device to transmit and receive a VoIP conversation.

The computer 206 may further include a software application component 310 for managing the operation of the computer 206 and a VoIP Service application component 308 for supporting various VoIP services. On one hand, the VoIP service application component 308 may include applications such as data packet assembler/disassembler applications, a structured hierarchy parsing application, audio Coder/Decoder (CODEC), video CODEC and other suitable applications for providing VoIP services. Generally described, these applications allow the computer 206 or a device communicatively connected to the computer 206 to send and receive data over an IP data network. On the other hand, the software application component 310 includes software applications that interact with and provide services directly to users.

In one embodiment, the software application component 310 on the computer 206 includes application programs that allow a limited-feature device such as a wireless telephone to access enhanced calling features. However, a limited feature device such as a wireless telephone may not have sufficient resources (e.g., processing power, memory, storage space, etc.) to store and/or execute instructions to access the enhanced calling features. In one embodiment and as described in further detail below with reference to FIGS. 7 and 8, a feature rich device such as the computer 206 provides resources so that enhanced calling features may be accessed by a limited feature device. For example, in the embodiment illustrated in FIG. 3A, the software application component 310 includes a voice recognition engine 312 and a command identification program 314. In one embodiment, a call conversation from a limited feature device such as the wireless telephone 202 is forwarded through a feature-rich device (e.g., the computer 206). The data stream is processed with the voice recognition engine 312, which generates text from the incoming audio. Then, the command identification program 314 uses the text to determine whether a command to send a data item to a receiving client was received. If data characteristic of a command is identified, enhanced calling features associated with the command may be accessed even though the wireless telephone 202 does not have sufficient resources to directly access the enhanced calling features.

Figure 3B:
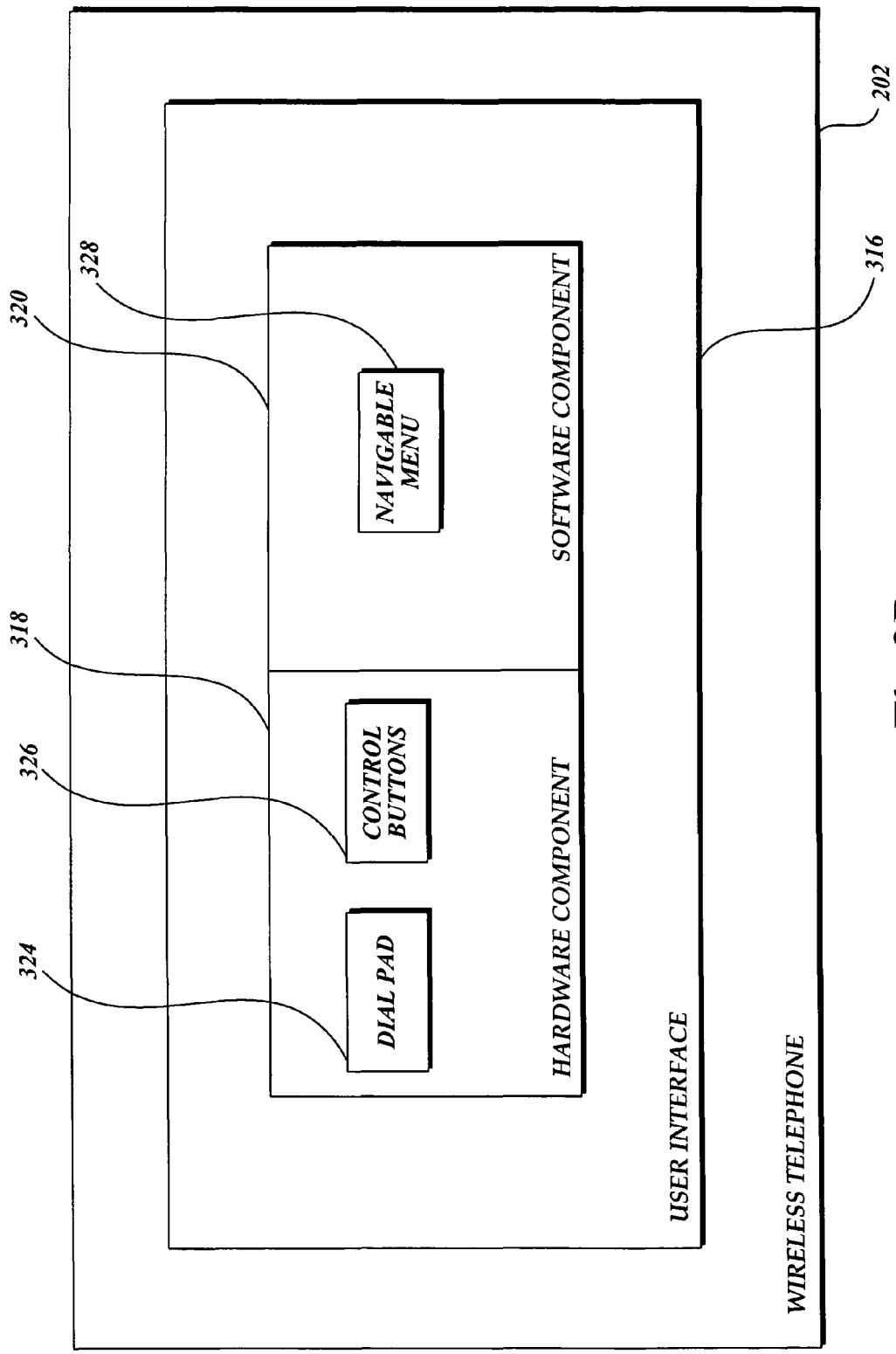
FIG. 3B is a block diagram illustrative of various components associated with a wireless telephone in accordance with an aspect of the present invention.

FIG. 3B is a block diagram of a VoIP device, namely the wireless telephone 202 that may be associated with one or more VoIP clients and used with embodiments of the present invention. Similar to the description provided above with reference to FIG. 3A, the wireless telephone 202 may include a multi-media I/O component, a network interface, a hardware component, a VoIP service application, and a software application component (not shown). Moreover, in one embodiment, the wireless telephone 202 is configured to use resources and/or software provided by an associated device (e.g., the computer 206). For example, a data stream that originates from the wireless telephone 202 may be processed with the voice recognition engine 312 and the command identification program 314 (FIG. 3A). In this regard, if data characteristic of a command is received, enhanced calling features that would not typically be available from the wireless telephone 202 may be accessed.

As illustrated in FIG. 3B, the wireless telephone 202 includes a user interface 316 which may be implemented in a hardware component 318, a software component 320, or any combination thereof. In this exemplary embodiment, the hardware component 318 includes a dial pad 324 and control buttons 326. In this regard, the wireless telephone 202 may be configured to send data items to a receiving client including, but not limited to, electronic documents (e.g., word processing documents, spreadsheets, PowerPoint presentations, and the like), graphical representations (pictures, images, icons, and/or animations etc.), procedure calls, and/or any other data type that may be represented digitally. It is generally acknowledged that significant amounts of information may be communicated that is non-verbal when individuals interact. In "face-to-face" communication individuals may make gestures, use various facial expressions, etc., each of which conveys information to parties involved in the communication. In accordance with one embodiment, a data item may be sent to a receiving party when control buttons 326 are activated. While specific examples of data items that may be sent using the control buttons 326 are described below, those skilled in the art and others will recognize that other data items may be sent without departing from the scope of the claimed subject matter.

In the exemplary embodiment illustrated in FIG. 3B, the user interface 316 also includes a software component 320. From the navigable menu 328 provided by the software component 320, a user may establish preferences to associate data items with the control buttons 326. Moreover, the navigable menu 328 provided by the software component 320 allows a sending party to select and send data items that are stored on associated devices. For example, the wireless telephone 202 may be communicatively connected to the computer 206. In this regard, the navigable menu 328 may be used by the sending party to identify and select a data item stored on the computer 206 or other associated device for transmission to a receiving party. By way of another example, a service provider may maintain a network location where different types of data items are made available. The wireless telephone 202 may be used to navigate to the network location and select a data item for transmission to a receiving party. Thus, a data item transmitted when control buttons 326 on the wireless telephone 202 are activated does not need to be stored locally. Instead, the control buttons 326 may be used to identify and send any local or network accessible data item that the sending party has the authority to access.

While FIGS. 2-3B depict the computer 206 and wireless telephone 202 as being associated with the same VoIP client 200, this configuration is exemplary and should not be construed as limiting. For example, as described in further detail below, processing performed by aspects of the present invention may be distributed across a plurality of devices and VoIP clients. In this regard, a command may be captured using a device associated with a first VoIP client, forwarded to a second VoIP client that is associated with an intervening VoIP entity (e.g., service provider) where voice-recognition on the data stream is performed to determine whether an audio-based command was received. Similarly, a command may be captured using a device associated with a first VoIP client, transmitted directly to a receiving client where the determination is made regarding whether a command was received. Thus, the exemplary embodiment described with reference to FIGS. 2-3B in which devices associated with the same VoIP client 200 collectively perform processing implemented by the present is merely one embodiment.

Figure 4:
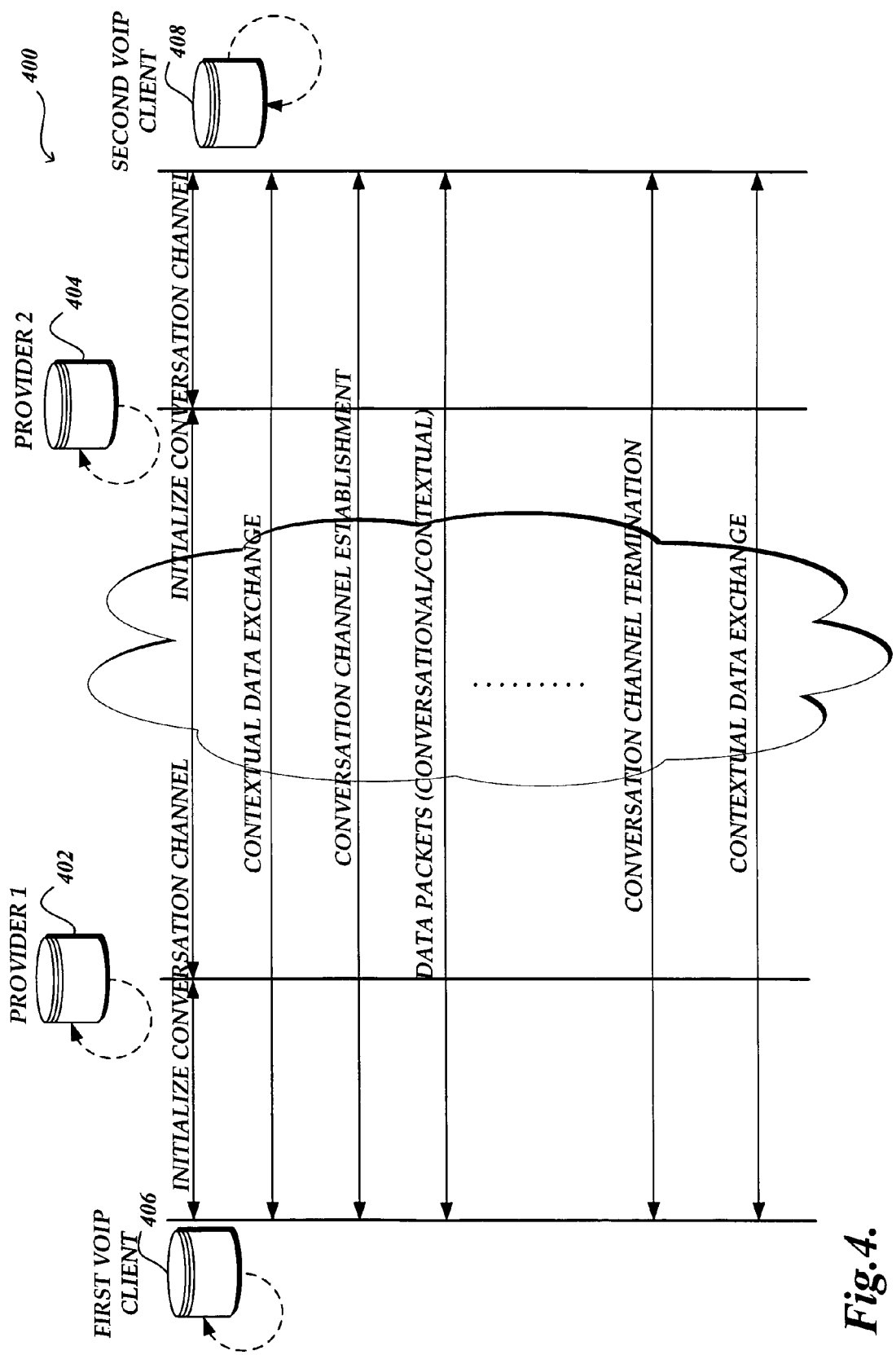
FIG. 4 is a block diagram illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 408. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers or other VoIP entities. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP client identifier associated with the client that is to be called. Provider 1 402 receives the request from the device of the first VoIP client 406 and determines a terminating service provider (e.g., Provider 2 404 of the second VoIP client 408) based on the unique VoIP client identifier included in the request. The request is then forwarded to Provider 2 404. This call initiation will be forwarded to the device of the second VoIP client 408. A conversation channel between the device of the first VoIP client 406 and a device of the second VoIP client 408 can then be established. Data items associated with a call may be immediately transmitted when the communication channel is established. Moreover, client devices may be used to exchange data items at any point after a communication channel is established and before the communication channel is terminated.

In an illustrative embodiment, before the devices of the first VoIP client 406 and the second VoIP client 408 begin to exchange data packets, contextual information may be exchanged. As will be discussed in greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the calling VoIP client 406 may include priority list of incoming calls from various potential calling VoIP clients including VoIP client 406, rules and preferences for exchanging data items and accessing functionality available from the VoIP clients, and the like.

Available media types, rules of the calling client and the client being called, and various data items may also be part of the contextual information that is exchanged during the connection set-up phase. The contextual information may be processed and collected by one of the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information, perform filtering on incoming or outgoing contextual information, and the like.

In response to a request to initiate a conversation channel, the second VoIP client 408 may accept the request for establishing a conversation channel or execute other appropriate actions such as rejecting the request or causing contextual information such as a data item to be "buffered" by the Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Moreover, either of the clients 406 or 408 may generate commands to transmit additional contextual information during a call such as data items that are relevant to the conversation.

Figure 5:
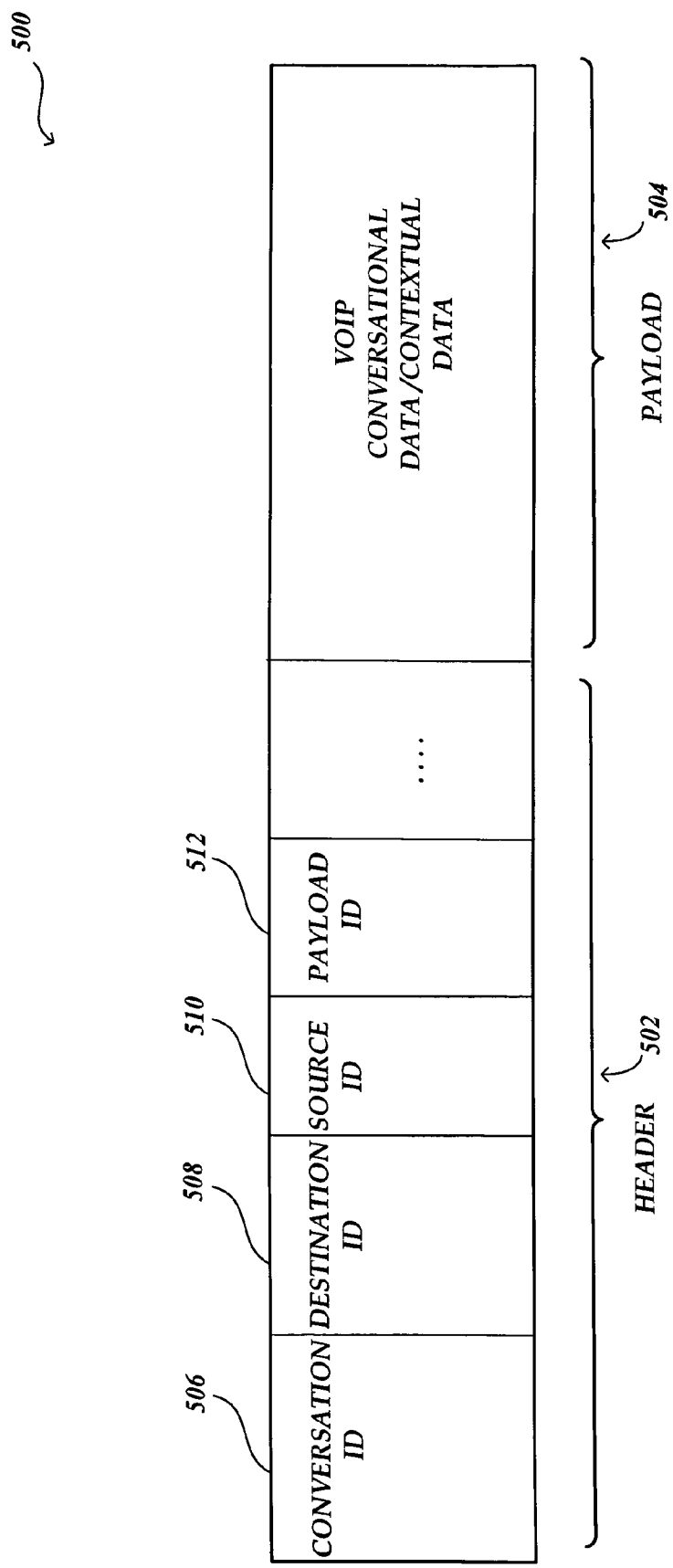
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP client identifier of the client being called, a Source ID 510 (unique VoIP client identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VCD devices, conversation channel connections (e.g., call basics), conversation context (e.g., call context), and the like. More specifically, the contextual information may include client preference, client rules including rules for accessing functionality available from the VoIP clients, restrictions on sending and receiving data items, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify, and/or delete VoIP client's contextual data before forwarding the contextual information. For example, a client's confidential information will be deleted by the VoIP service provider associated with that client unless the client authorizes such information to be transmitted. In some cases, a minimal amount of contextual information or no contextual information may be exchanged.

Figure 6:
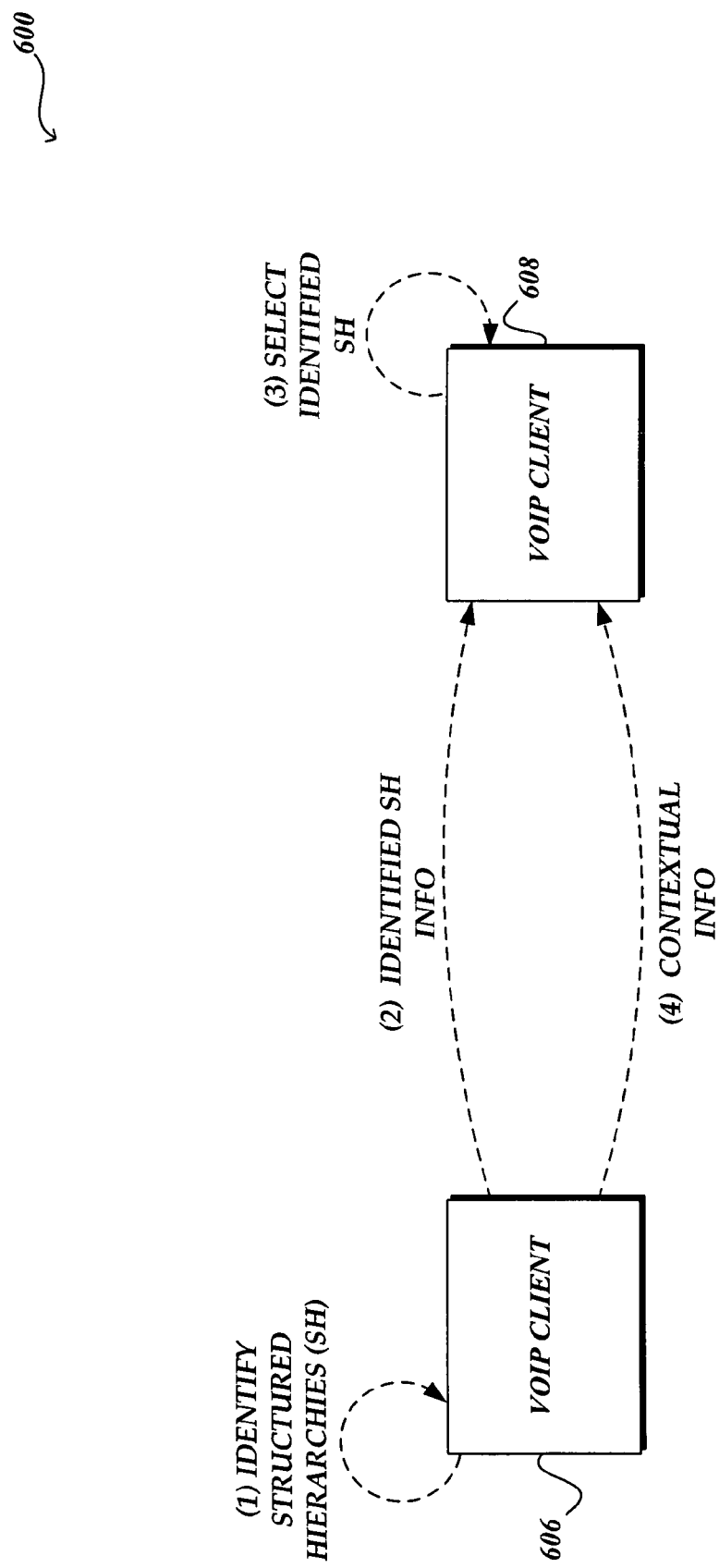
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with. FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner, which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
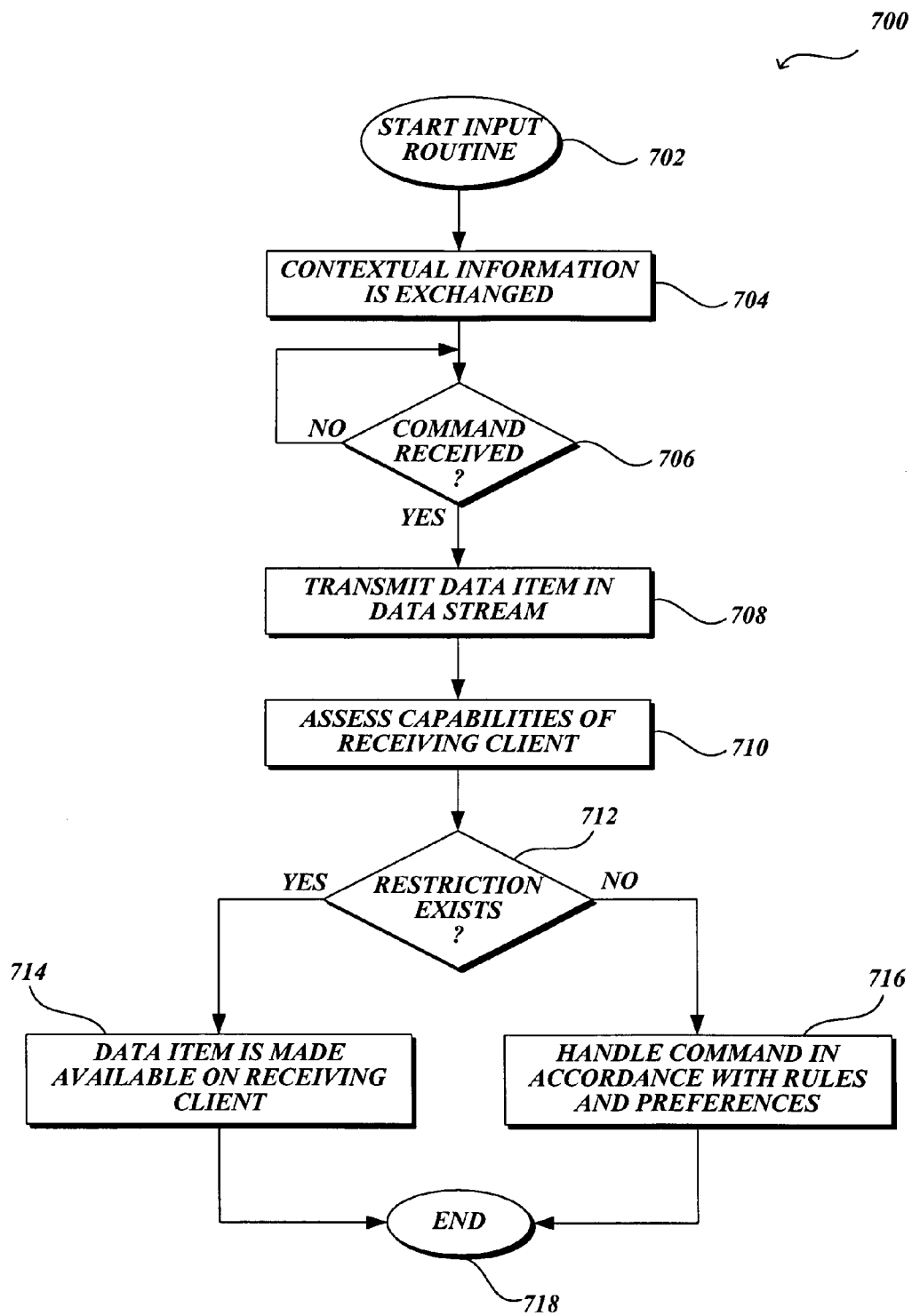
FIG. 7 is an exemplary flow diagram for transmitting a data item from a sending client to a receiving client.
Figure 8:
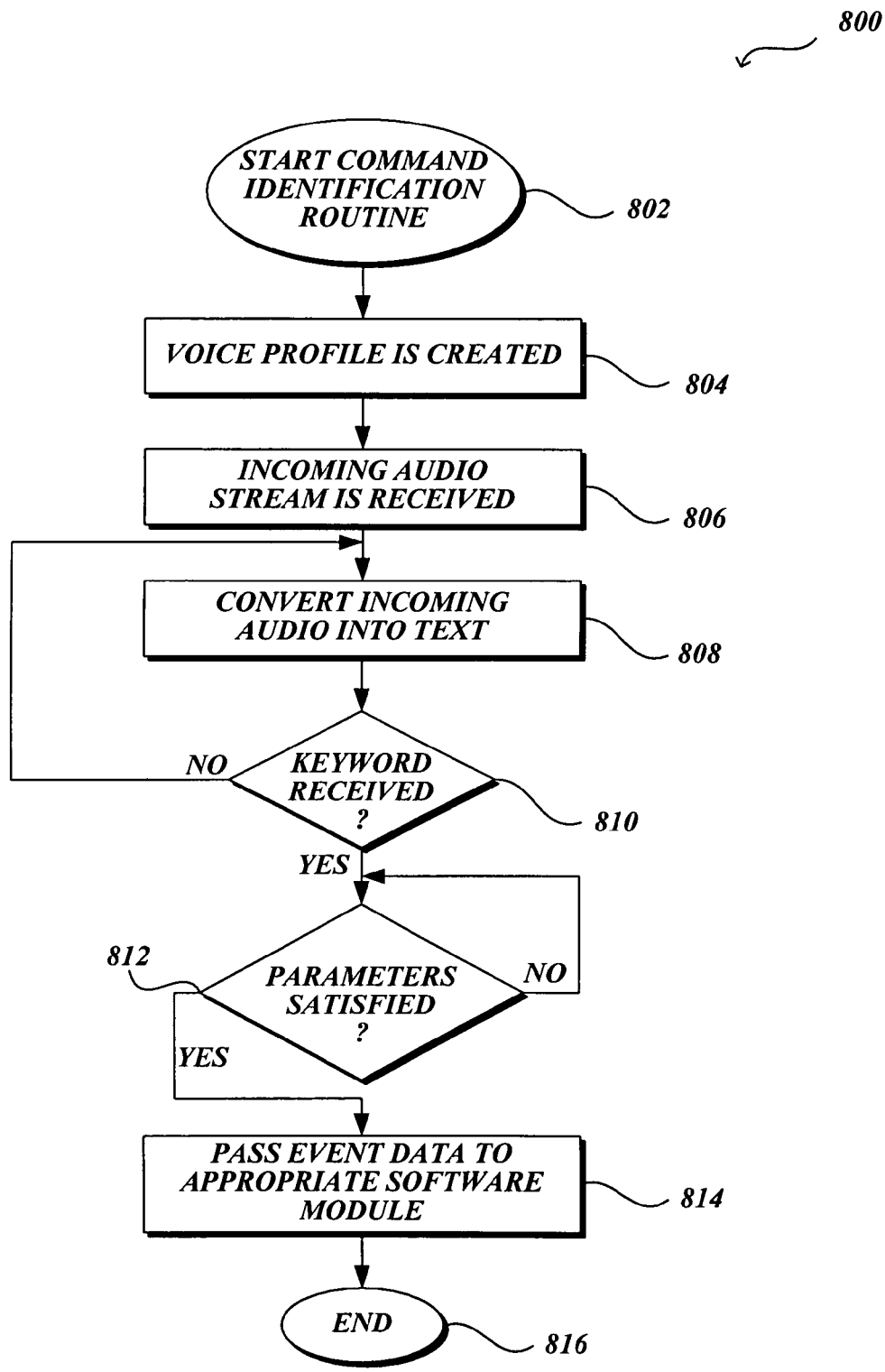
FIG. 8 is an exemplary flow diagram for identifying an audio-based command in accordance with an embodiment of the present invention.
Figure 9:
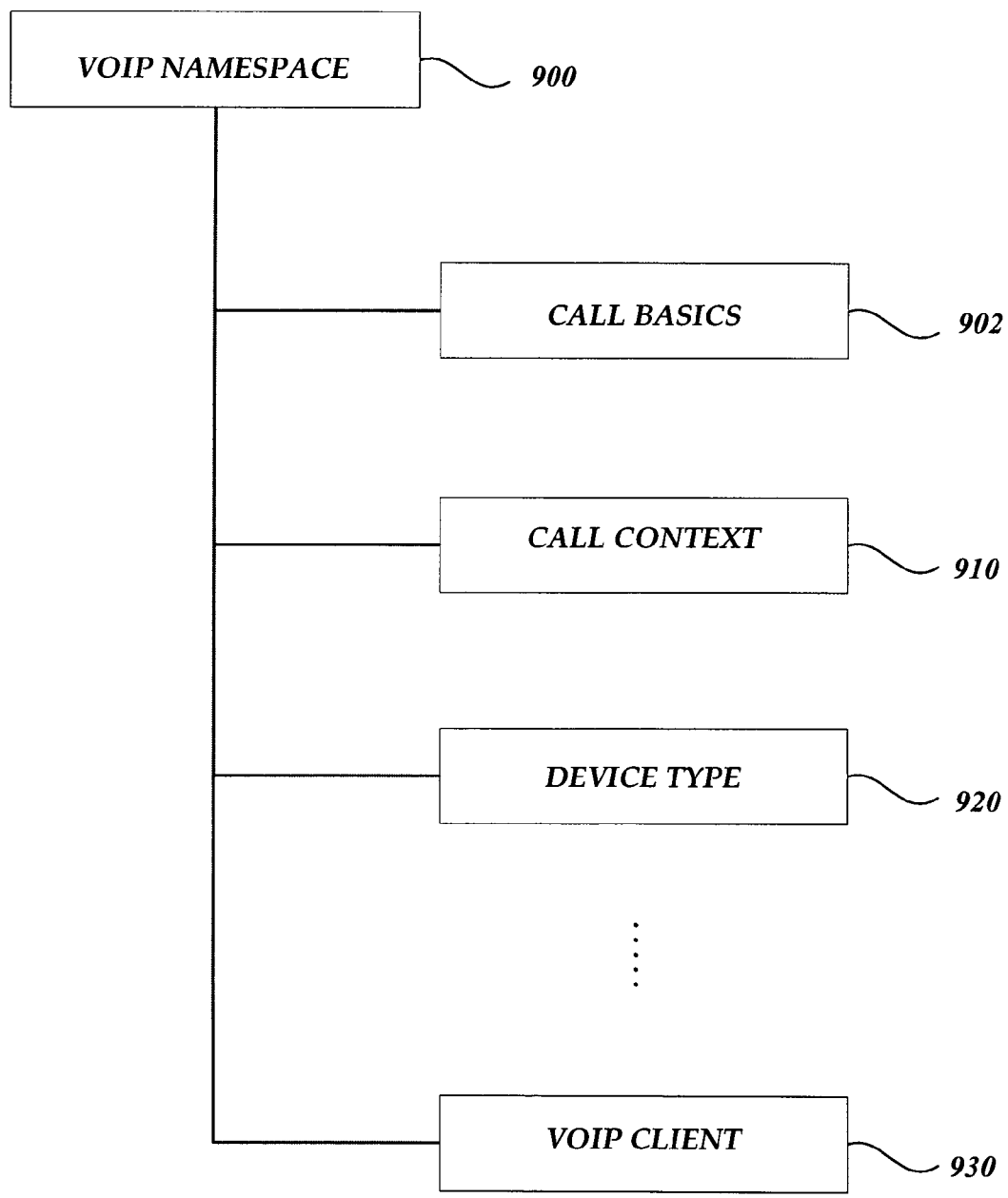
FIGS. 9-13 are block diagrams illustrative of various attribute and classes of structured hierarchies corresponding to VoIP contextual information in accordance with an aspect of the present invention.

With reference now to FIGS. 7 and 8, aspects of the present invention will be described that are directed at allowing a sending party to transmit a data item as contextual information to a receiving party. In this regard and in accordance with one embodiment, controls for generating a command to transmit a data item concurrently with or independently of conversation data are provided. As mentioned previously, a device such as a wireless telephone may be configured with hardware controls (e.g., buttons) that, when activated, cause a data item associated with a hardware control to be sent to a receiving party. By way of another example, voice commands may be input into a client device for the purpose of identifying and sending a data item.

Now with reference to FIG. 7, an exemplary input routine 700 will be described. Generally described, the input routine 700 implements logic for handling commands to send data items in an IP telephony environment. As an initial matter, aspects of the input routine 700 may be implemented in a client device or distributed across multiple clients and associated devices. For example, the processing performed by the input routine 700 may be distributed to accommodate limited feature devices that do not have the resources for accessing certain enhanced calling features. Prior to the input routine 700 being executed, a caller may use a client device (e.g., IP telephone, computer, wireless telephone, etc.) to cause a communication channel to be established with a receiving client. In one embodiment, the sending party may generate a command to send a data item to the receiving party concurrently with call data while the parties are engaged in a conversation. In another embodiment, the data item may be transmitted independently of a call.

As mentioned previously, limited feature devices such as a POTS or wireless telephones may be used to communicate over an IP telephony environment. However, these types of devices may not have sufficient resources (e.g., processing power, memory, storage space, etc.) to store or execute instructions for accessing enhanced calling features available from the IP telephony environment. In one embodiment, execution of the input routine 700 may be distributed across a plurality of clients and associated devices. Moreover, remote clients and devices may be accessed by the input routine 700 to send a data item to a receiving party. For example, a limited feature device such as a wireless telephone may be configured with hardware-based controls (e.g., buttons) to send a data item to a receiving client. More specifically, a wireless telephone or other limited feature device may be used to transmit data items in the form of electronic documents (e.g., word processing documents, spreadsheets, PowerPoint presentations, etc.), graphical representations (pictures, images, icons, animations etc.), procedure calls, and/or any other data type that may be represented digitally. However, the data item that is transmitted does not need to be stored on the limited feature device. Instead, the data item may be accessed from a remote device or at a network location. In the example provided above, controls available from the wireless telephone may be used to identify a data item on local or remote storage that a sending party has the privilege to access. Then, as described in further detail below, the control may be activated to send the data item to a receiving party.

As illustrated in FIG. 7, the input routine 700 begins at block 702, and at block 704 sets of contextual information is exchanged between a sending and receiving client. In one embodiment and as mentioned previously, contextual information may be exchanged as structured hierarchies that are defined in accordance with an XML namespace. Moreover, not only is contextual information exchanged in this way during the call set-up phase (at block 702), the contextual information may also be exchanged after the call set-up phase, during a call conversation, or after call termination. Although the illustrative embodiment described in connection with the input routine 700 is focused on interactions that occur between two clients, the routine 700 is equally applicable when more than two clients or other VoIP entities participate in a call (e.g., conference call).

It should be well understood that a communication channel between sending and receiving clients may be established across any number of different VoIP entities (e.g., clients, client devices, service providers, third party service providers, etc.). Stated differently, the contextual information exchanged at block 704 may be received and forwarded by one or more intervening VoIP entities. Moreover, depending on the capabilities of the devices that establish the communication channel, processing performed by the input routine 700 may be distributed across these intervening VoIP entities. For example, audio-based commands may be captured from a sending party using a limited feature device. However, the limited feature device may not have sufficient resources to determine when an audio command was received. Instead, an intervening VoIP entity or a device associated with the receiving client may perform voice-recognition on a data stream to determine when an audio-based voice command was received.

At block 706, the input routine 700 remains idle until a command to send a data item generated using hardware, software, or voice activated control is received. In this regard and as mentioned previously, aspects of the present invention may be implemented to enhance the capabilities of a limited feature device. In one embodiment, a limited feature device is configured with a plurality of hardware-based controls (e.g., buttons), for sending data items to a receiving client. In another embodiment and as described in further detail below with reference to FIG. 8, audio-based commands may be received. In any event, those skilled in the art and others will recognize that when a control is activated, event data may be obtained that identifies the control and other data input by the sending party.

The command received at block 706 may be directed at transmitting data that will be presented to a receiving party. In this regard, the sending party may generate a command to send an electronic file to a receiving party concurrently or independently of a call. In one embodiment, graphical representations and/or animations from a package of data items that includes smiles, frowns, winks, or other facial expressions that depict a human emotion may be sent and presented to a receiving party. However, the command may also be directed at accessing functionality exposed by a receiving client. For example, a device associated with the receiving client, such as a wireless telephone, may maintain functionality to vibrate, play an audio file, display an image, etc., or perform other action that is exposed from a programming interface. In this regard, a data item transmitted between a sending and receiving client may include procedure calls directed at accessing this type of functionality. Stated differently, using controls provided by the present invention, a sending party may generate a remote procedure call to cause a specified action to occur on a receiving client. As described in further detail below, a receiving party may establish preferences and/or rules to restrict or limit the actions that may be accessed by a sending party.

At block 708, the input routine 700 causes the data item to be included in a data stream being transmitted to the receiving client. Stated differently, if block 708 is reached, packets with the appropriate header information and data item represented in the payload are transmitted to the receiving client. In this regard, causing the data item to be included in the data stream may involve generating a tag which describes the semantics of presenting the data item on the receiving client. For example, a tag that conforms to XML or other standardized format may be embedded in the data stream at block 708. In one embodiment, the tag includes processing instructions or a script of actions that will satisfy the command generated by the sending party. As described in further detail below, when a tag embedded in a data stream is received, the instructions may be executed for the purpose of presenting a data item and/or performing other actions required by a sending party.

A data lookup is performed, at block 710 to assess the capabilities, preferences, and rules associated with the receiving party. More specifically, when the command is received, the input routine 700 processes the contextual information obtained during the call set-up phase or sometime thereafter to identify any restrictions that may exist in sending and presenting the data item to the receiving party. In this regard, a receiving party may employ any number of different types of client devices, with each client device having potentially different device capabilities. For example, some feature-rich client devices are able to present or process date items that adhere to any number of different formats. Other client devices are more limited and, for example, may only be able to send/receive audio data. In this regard, the data lookup performed at block 710 obtains information used to identify whether the data item is restricted from being presented to a receiving party. Moreover, a receiving party may establish preferences and/or rules that place explicit restrictions on presenting a data item and/or performing a requested action. For example, if the receiving party is using a wireless telephone that maintains a limited bandwidth connection, restrictions may be established so that a memory intensive data item (e.g., image, video, etc.) may not be transmitted or presented on the wireless telephone. Also, a sending party may issue a command to cause an audio file to be sent and played on a client device associated with the receiving party. However, a receiving party may establish a rule to only allow an audio file to be played at specific times, when received by a particular individual, and the like. By way of another example, a user with elevated privileges (e.g., parents) may place restrictions on the types of data items that other users (e.g., children) may receive. Since the capabilities, preferences, and rules associated with the receiving party may restrict instructions associated with a data item from being executed, this data is identified. In accordance with one embodiment, the capabilities, preferences, and rules associated with the receiving party are identified from contextual information represented in the Device Type Class 920, described in further detail below with reference to FIG. 12.

As illustrated in FIG. 7, at block 712, a determination is made regarding whether a restriction, if any, exists that prevents instructions associated with the data item from being executed on a client device associated with the receiving party. As mentioned previously, restrictions may be established to prevent instructions associated with the data item from being executed. Stated differently, the command received a block 706 may not be satisfied if the receiving client device is not capable of presenting the data item or the receiving party has established a rule or preference to prevent execution of instructions associated with the data item. In instances when a restriction exists, a determination is made that the result of the test performed at block 712 is "NO" and the input routine 700 proceeds to block 716. Conversely, when a restriction does not exist, the input routine 700 proceeds to block 714.

At block 714, the command generated by the sending party, at block 706 is satisfied when a data item is presented or otherwise made available on a receiving client. Presenting the data item may include applying preferences established by a receiving party or provided by default. For example, presenting the data item may include launching an application program and using the application program to play an audio file, display an image, or otherwise execute instructions included with a data item. Moreover, presenting the data item may include issuing a procedure call to a program interface that is accessible from the receiving client. For example, functions may be issued to cause a client device to vibrate or otherwise access the functionality exposed by a programming interface available from the client device. Then the input routine 700 proceeds to block 718, where it terminates.

At block 716, the command generated by the sending party at block 706 is handled in accordance with established rules and preferences. If block 716 is reached, a restriction that prevents instructions associated with a data item from being executed was identified. In this instance, the input routine 700 may perform any number of different actions to handle the command. For example, a data item that is not capable of being presented or otherwise made available on a receiving client may be "buffered" by an intervening entity until a later time. In one embodiment, when the receiving party is identified as being associated with a feature-rich client device, the data item may be forwarded. Similarly, a data item that is "buffered" by an intervening VoIP entity may be sent in a voicemail message. Moreover, it is also contemplated that the request to present a data item may not be processed at all. For example, anti-malware software may be configured to search network traffic sent to a receiving client. If a data item sent to the receiving client is characteristic of malware (e.g., viruses, worms, spyware, Trojans, etc.) the data item will not be forwarded to the receiving party. Then, the input routine 700 proceeds to block 718, where it terminates.

As mentioned previously, commands for sending a data item may be generated using any number of different types of controls. For example, the command received by the input routine 700, at block 706, may be generated using a hardware, software, and/or audio-based control. In one embodiment, aspects of the present invention are configured to identify when a command in an incoming audio stream is received. More specifically, the command identification routine 800, described below, processes incoming audio data to differentiate between content in a call and input that is directed at generating a command. In this regard, the command identification routine 800 may be configured to work in conjunction with the input routine 700 described above with reference to FIG. 7. When audio data directed at generating a command is received, the command identification routine 800 notifies the input routine 700 and provides event data used to satisfy the command.

Now with reference to FIG. 8, a command identification routine 800 that processes incoming data to determine whether an audio-based command was received will be described. As an initial matter, the command identification routine 800 may use a voice recognition engine to convert incoming audio to text in order to identify when a keyword associated with a command was received. However, different modes of operation are provided to prevent "false positives" or instances when a command is generated when a sending party did not intend to generate the command. In this regard, services provided by the command identification routine 800 may be accessed using different modes of operation including, but not limited to a "command" mode and a "standard" mode. Generally described, in the command mode, a command is more readily generated so that, for example, any occurrence of a keyword is interpreted as being a command. On the other hand, in "standard" mode configurable parameters that allow a party to provide input for differentiating between a command and content are provided.

As illustrated in FIG. 8, the command identification routine 800 begins at block 802 and at block 804 a voice profile for an individual ("sending party") is created. Collection of data packets and creation of a voice profile may be accomplished, for example, upon activation and setup of a VoIP account. Using the set of data packets received during activation of the account, a voice profile for the individual is created. Because each individual speaks a little differently, each will have a unique voice profile that includes digital representations of phonetic sounds of the language being profiled. The digital representations of phonetic sounds are used to identify words, such as keywords, spoken by the individual in an incoming audio stream. Moreover, voice attributes which may include the frequency and/or amplitude range within which the individual speaks are analyzed. Representations of the voice attributes may be included in the individual's voice profile so that audio falling outside of either the frequency and/or amplitude range spoken by the individual may be filtered or removed from an incoming data steam. Those skilled in the art and others will recognize that aspects of the present invention may be used with any currently existing, or yet to be developed, system that develops a voice profile for an individual so that audio may be accurately converted to text.

Once a voice profile has been created, data in an incoming audio stream is analyzed to determine whether a command to send a data item was generated. For illustrative purposes, the command identification routine 800 begins receiving a stream of audio data, at block 806. In one embodiment, the data stream is captured using the audio system of a device that is capable of transmitting packets over an IP telephony environment. For example, the stream of audio data may be captured on a limited feature device such as wireless telephone, an IP telephone, and the like. In this regard, the processing performed by the command identification routine 800 may be executed in the device that captures the audio data. Alternatively, the stream of data may be forwarded and processed on a remote device. In any event, at block 806, the command identification routine 800 begins receiving data in an incoming data stream.

As the incoming audio stream is received, a voice recognition engine is used to convert the audio data into text, at block 808. Those skilled in the art and others will recognize that a voice recognition engine may be accessed by other software components, such as the command identification routine 800, to convert a stream of audio-based data into text. In this regard, a voice profile associated with the individual that generated the stream of audio data is retrieved. Then, using information reflected in the voice profile, the voice recognition engine generates words from the phonetic sounds in the received audio stream.

As illustrated in FIG. 8, at block 810, the command identification routine 800 determines whether a word associated with a command ("keyword") was received. Stated differently, a determination is made regarding whether the voice recognition engine identified a word in the incoming stream that is assigned significance by aspects of the present invention. In accordance with one embodiment, a plurality of command grammars are provided that each define a set of keywords. Depending on the circumstances in which the audio stream is received, different command grammars and their associated keywords are used to determine whether a command was received. For example, a service provider may offer enhanced calling services that enable parties interested in social networking to access enhanced calling features accessible using an IP telephony environment. A current command grammar appropriate for communicating in the context of social networking may be used to define the keywords that will generate a command. In this regard, a comparison is performed between words identified by the voice recognition engine, at block 808, with the keywords defined in the current command grammar. If a keyword is identified in the incoming data stream, the command identification routine 800 proceeds to block 812, described in further detail below. Conversely, if a word identified by the voice recognition engine does not match a keyword, the command identification routine 800 proceed back to block 808, and blocks 808-810 repeat until a keyword is identified.

At block 812, a determination is made regarding whether parameters for generating a command associated with the identified keyword have been satisfied. If block 812 is reached, the incoming data stream includes a keyword in the current command grammar. In some instances, generating a command may include obtaining data in addition to the identified keyword. For example, if the keyword is directed at generating a command to send a data item between parties to a call, a parameter to the command may be the identity of the data item that will be transmitted. In one embodiment, audio prompts that allow a sending party to select a data item, from a menu of data items, is provided to obtain the additional parameters. However, additional parameters may not need to be satisfied as a command may be generated whenever a keyword is identified.

Various types of parameters may be used to differentiate between commands and content being transmitted between parties to a call. As mentioned previously, different modes of operation are provided including a command mode and a standard mode. Each mode of operation may be associated with its' own set of parameters that will be satisfied in order for a command to be generated. In this regard, configurable parameters may be established for each mode of operation so that a sending party may generate input to differentiate between a command and content. In one mode of operation, activation of a control may signify that a "keyword" received subsequent to the control being activated is directed at generating a command. In another mode of operation, a "pause" of a predetermined length before a keyword may signify that incoming data is a command. While specific examples of parameters have been provided, those skilled in the art and others will recognize that other parameters may be used to indicate that a command is being received. In any event, if parameters for generating the command are satisfied, the command identification routine 800 remains idle until the parameters are satisfied or an error condition exists.

As illustrated in FIG. 8, at block 814, the command identification routine 800 passes event data to a software module that is configured to satisfy the command. If block 814 is reached, the command identification routine 800 identified a command in an incoming data stream. In this instance, event data is forwarded to a software module that is capable of satisfying the received command. For example, the command identification routine 800 may be used to provide event data to the input routine 700 described above with reference to FIG. 7. In this example, the event data associated with the command is received by the input routine 700 at block 706. As a result, an audio-based command may be used to send a data item from a sending party to a receiving party. Then, the command identification routine 800 proceeds to block 816, where it terminates.

With reference to FIGS. 9-12, block diagrams illustrative of various classes and attributes of structured hierarchies corresponding to VoIP contextual information are shown. As mentioned above, structured hierarchies are predefined organizational structures for arranging contextual information to be exchanged between two or more VoIP devices. Structured hierarchies can be defined, updated, and/or modified by redefining various classes and attributes. The VoIP contextual information exchanged between various VoIP entities may correspond to a VoIP namespace 900. In one embodiment, the VoIP namespace 900 is represented as a hierarchically structured tree of nodes, each node corresponding to a subclass, which corresponds to a subset of VoIP contextual information. For example, a VoIP Namespace 900 may be defined as a hierarchically structured tree comprising a Call Basics Class 902, a Call Contexts Class 910, a Device Type Class 920, a VoIP Client Class 930, and the like.

Figure 10:
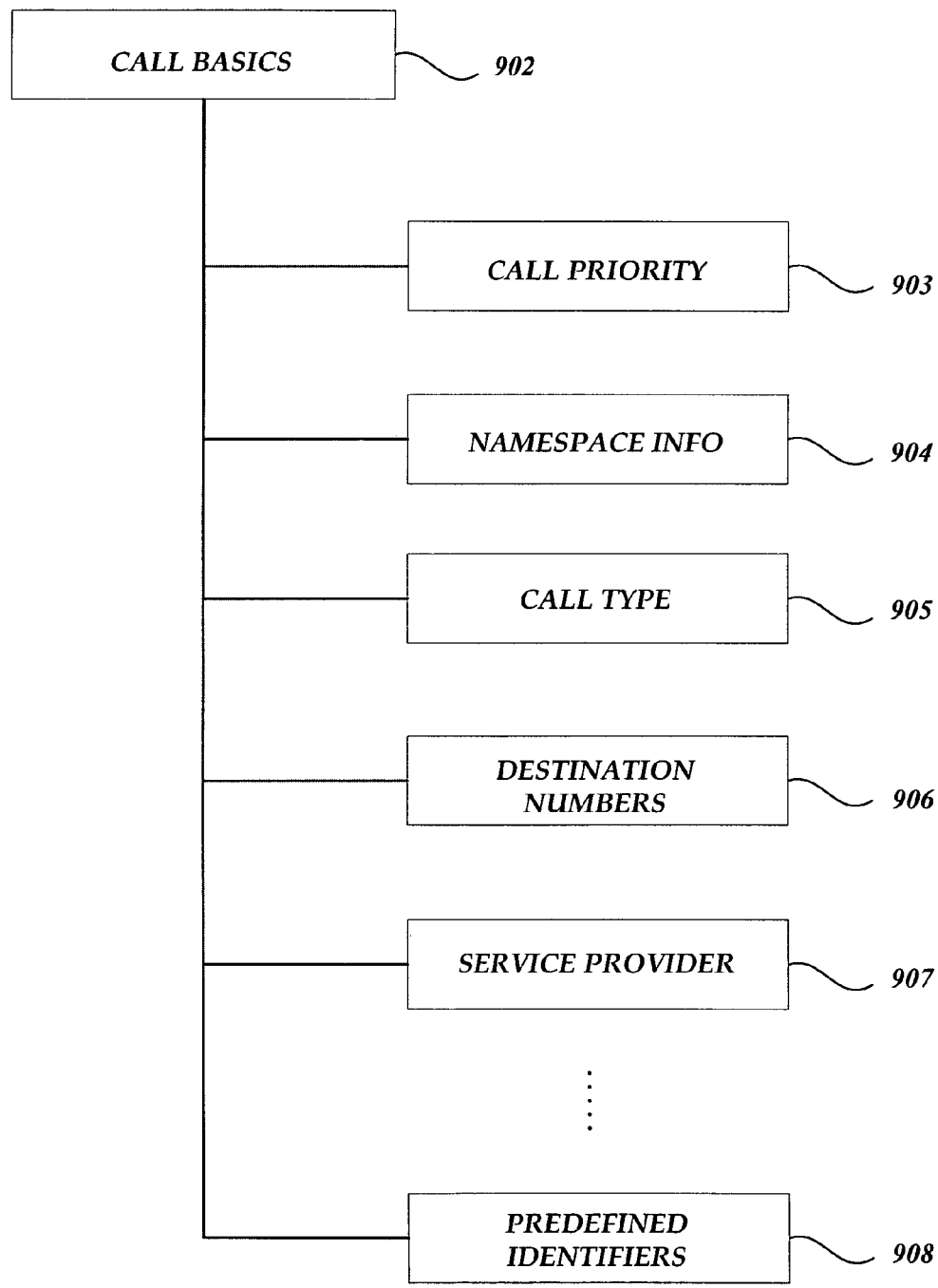

With reference to FIG. 10, a block diagram of a Call Basics Class 902 is shown. In an illustrative embodiment, the Call Basics Class 902 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call type information, rules for sending/receiving data items, and the like. In one embodiment, the contextual information relating to a conversation channel connection may include predefined identifiers which represent data items corresponding to graphical representations and/or animations of facial expressions. A Call Basics Class 902 may be defined as a sub-tree structure of a VoIP Namespace 900, which includes nodes such as call priority 903, namespace information 904, call type 905, destination numbers 906, service provider 907, predefined identifiers 908, and the like.

Figure 11:
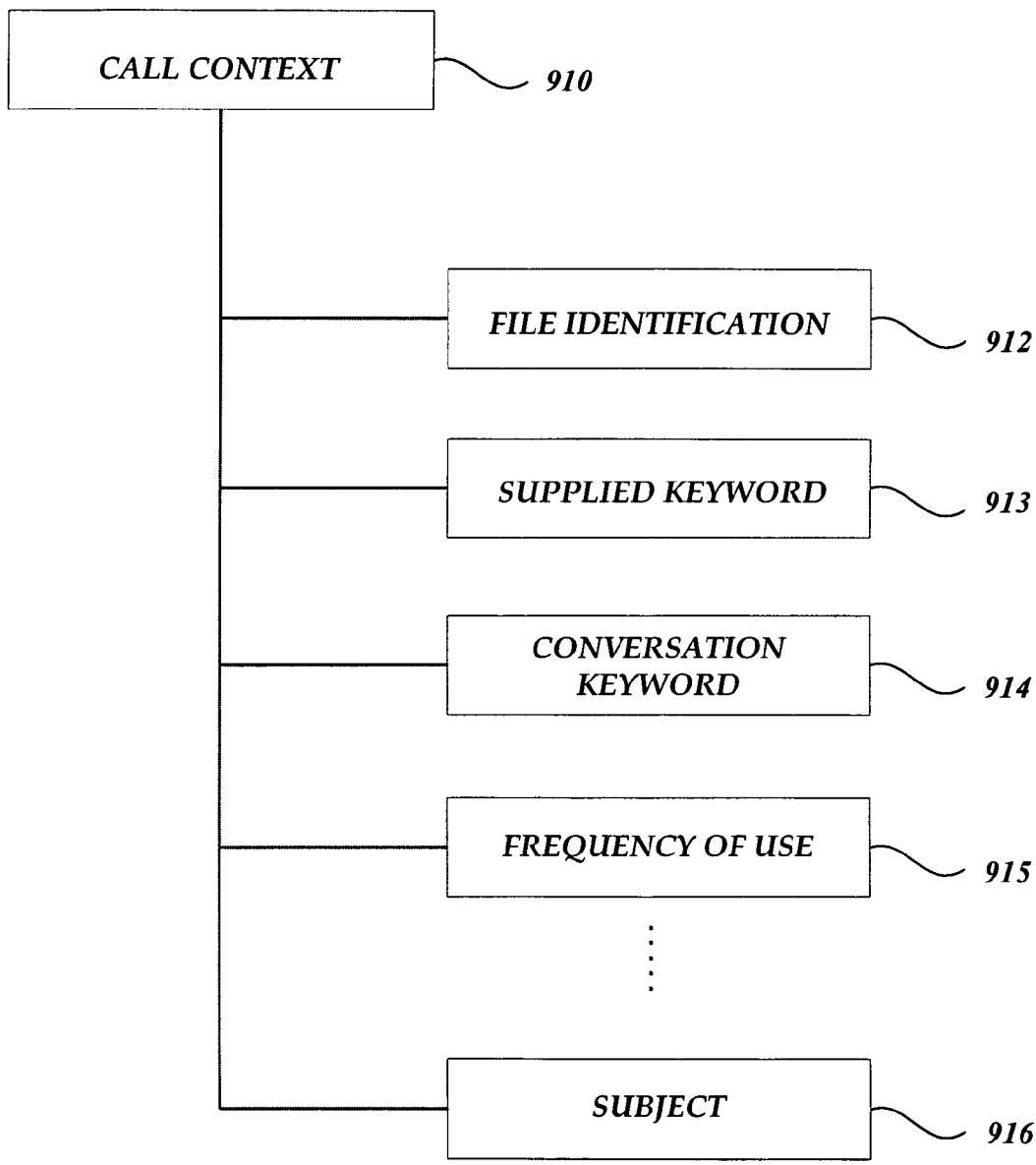

With reference to FIG. 11, a block diagram of a Call Contexts Class 910 is shown. In one embodiment, a subset of VoIP contextual information relating to conversation context may correspond to the Call Contexts Class 910. The contextual information relating to conversation context may include information such as keywords supplied from a client, a service provider, a network, etc. The contextual information relating to conversation context may also include identified keywords from a file, identified keywords from a conversation data packet (e.g., conversation keywords), file names for documents and/or multimedia files exchanged as part of the conversation, frequency of use (including frequency and duration of calls relating to a certain file, a certain subject, and a certain client), among many others. In accordance with an illustrative embodiment, a Call Contexts Class 910 may be defined as a sub-tree structure of a VoIP Namespace 900, which includes nodes corresponding to file identification 912, supplied keyword 913, conversation keyword 914, frequency of use 915, subject of the conversation 916, and the like.

Figure 12:
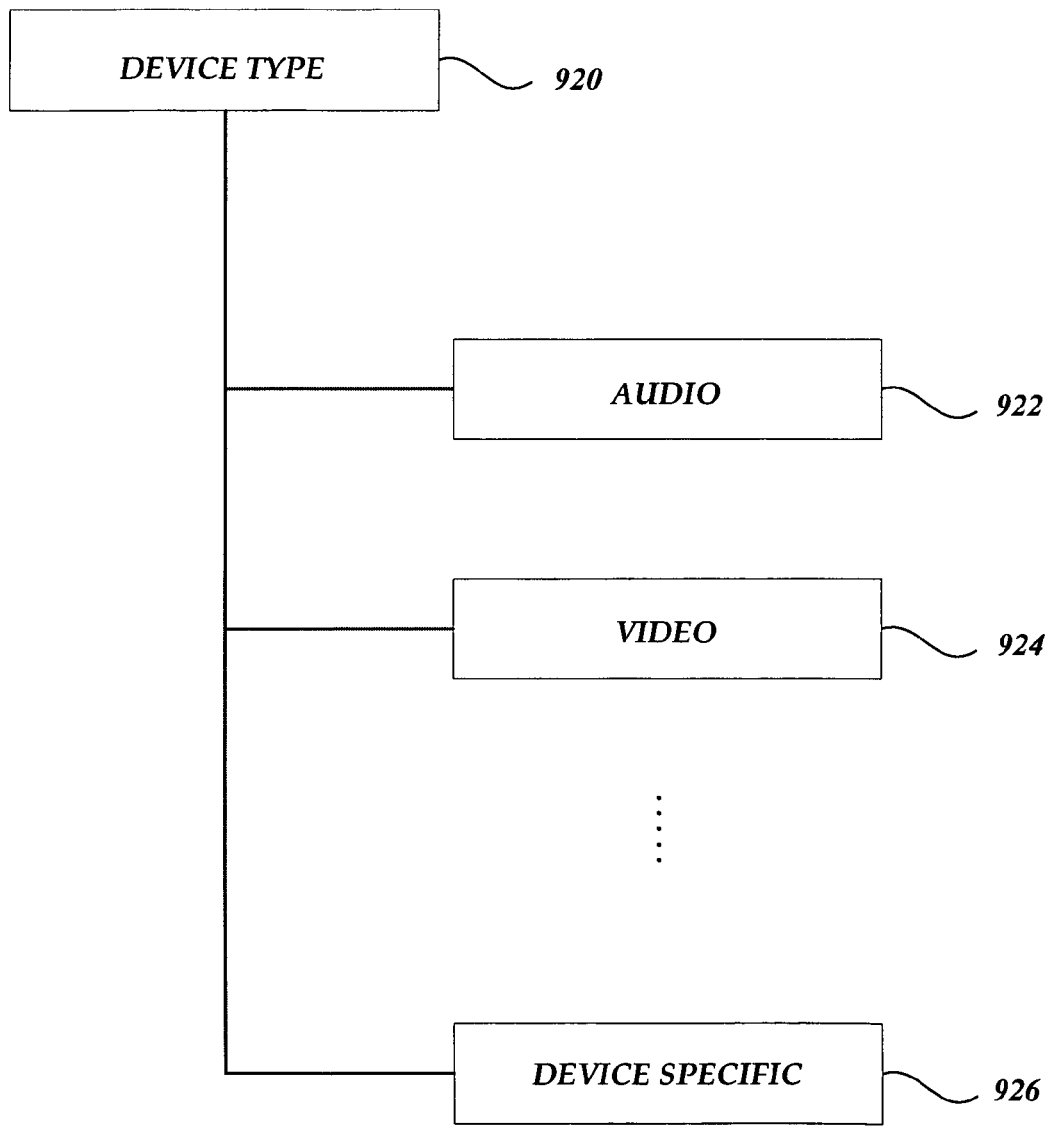

With reference to FIG. 12, a block diagram of a Device Type Class 920 is depicted. In one embodiment, a Device Type Class 920 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, or capabilities in processing data items, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 920 may be defined as a sub-tree structure of a VoIP Namespace 900, which includes nodes corresponding to Audio 922, Video 924, Device Specific 926, and the like.

Figure 13:
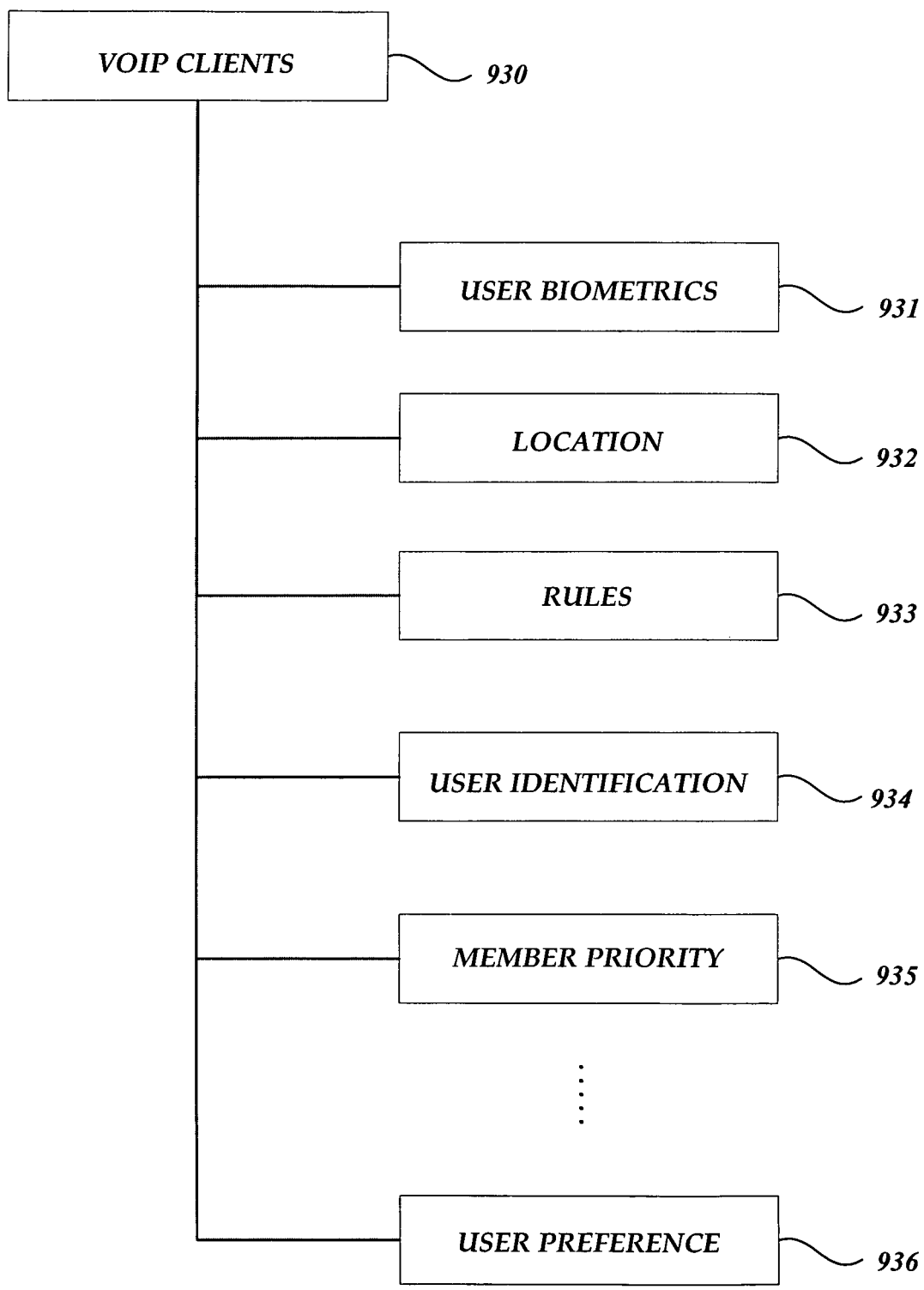

With reference to FIG. 13, a block diagram of a VoIP Client Class 930 is depicted. In accordance with an illustrative embodiment, a VoIP Client Class 930 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual), digital signature information, biometric information, assigned phone number, user contact information (such as name, address, company, and the like), rules and preferences defined by the client, a service provider, a network, etc. In one embodiment, a VoIP Client Class 930 may be defined as a sub-tree structure of a VoIP Namespace 900, which includes nodes corresponding to user biometrics 931, location 932, rules 933, user identification 934, member priority 935, client preference 936, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-readable storage medium that is not a signal storing computer-readable instructions which, when executed in an IP telephony environment that includes a sending client and a receiving client performs a method of identifying an audio-based command to send a data item from the sending client to the receiving client, the method comprising:
   in response to receiving an audio stream at the sending client;
   determining whether the audio stream contains a command that identifies a data item that is associated with activation of a control from the sending client to send to the receiving client, wherein different controls on the sending client are associated with different data items, wherein determining whether the audio stream contains the command to send the data item to the receiving client includes differentiating between data in the audio stream that is directed at generating the command and data that is content; and
   identifying that the command to send the data item is included in the audio stream;
   identifying the data item that is the object of the command; wherein the data item comprises one or more of: a remote procedure that is executed on the receiving client and an electronic file; and
   transmitting the data item to the receiving client over the IP telephony environment.

2. The computer-readable storage medium as recited in claim 1, wherein determining whether the audio stream contains the command to send the data item to the receiving client includes using a voice recognition engine to convert the audio stream into text.

3. The computer-readable storage medium as recited in claim 2, wherein the voice recognition engine is located on an intervening client that identifies when the command is received.

4. The computer-readable storage medium as recited in claim 1, wherein determining whether the audio stream contains the command to send the data item to the receiving client includes performing a comparison between words identified by a voice recognition engine with a set of keywords defined in interchangeable command grammars.

5. The computer-readable storage medium as recited in claim 1, wherein determining whether the audio stream contains the command to send the data item to the receiving client includes determining whether parameters associated with the command have been satisfied.

6. The computer-readable storage medium as recited in claim 5, further comprising allowing a sending party to provide input by satisfying a parameter to differentiate between the command and content.

7. The computer-readable storage medium as recited in claim 5, wherein the parameter is the identity of the data item that will be transmitted to the receiving client.

8. The computer-readable storage medium as recited in claim 5, wherein different modes of operation are provided that define different sets of parameters for generating the command.

9. The computer-readable storage medium as recited in claim 5, wherein satisfying the command to send the data item to the receiving client includes passing event data to a software module that is configured to send the data item to the receiving client.

10. The computer-readable storage medium as recited in claim 1, further comprises providing a navigable menu where the data item may be selected from storage on a remote device for sending to the receiving client.

11. In an IP telephony environment that includes a sending client and a receiving client, a method of sending a data item over a communication channel from the sending client to the receiving client, the method comprising:
   providing controls that are associated with different data items including a portion of data items that are electronic files stored on remote devices;
   in response to one of the controls being activated on the sending client:

obtaining event data from the sending client that identifies the data item associated with the activated control, wherein the data item is stored on at least one of the remote devices;

causing the data item to be included in an outgoing data stream that is transmitted to the receiving client over the IP telephony environment; wherein the data item comprises one or more of: a remote procedure that is executed on the receiving client and an electronic file, wherein the control is an audio-based control that is activated when a keyword is identified in an audio stream received at the sending client; and determining that the audio stream contains a command that identifies the data item that is associated with activation of the control from the sending client to send to the receiving client.

12. The method as recited in claim 11, further comprising:
identifying preferences for making the data item available on the receiving client; and
presenting the data item on the receiving client in accordance with the identified preferences.

13. The method as recited in claim 11, wherein in the command is generated in response to the activation of a hardware-based control.

14. The method as recited in claim 11, wherein the data item includes the remote procedure call and is configured to access functionality exposed by a programming interface on the receiving client comprising performing a specified action on the receiving client.

15. The method as recited in claim 11, wherein causing the data item to be included in the outgoing audio stream includes allowing a sending party to identify the data item that is stored on a remote device for transmission to the receiving client.

16. The method as recited in claim 11, wherein causing the data item to be included in the outgoing data stream that is transmitted to the receiving client includes:
determining whether a restriction exists in presenting the data item on the receiving client; and
if a restriction exists, storing the data item on the intervening client.

17. The method as recited in claim 11, wherein causing the data item to be included in the outgoing data stream includes using a device associated with the sending client that maintains sufficient resources to determine that the audio-based command was received.

18. The method as recited in claim 11, further comprising:
providing a navigable menu where the data item may be selected from storage on a remote device for sending to the receiving client.

19. A system comprising:
a device for transmitting a data item over an IP telephony environment executed at least in part by a computing device, the computing device comprising:
at least one processor;
a memory storing computer-executable instructions that, when executed by the at least one processor, perform a method comprising:
providing controls that are associated with different data items including a portion of data items that are electronic files stored on remote devices;
in response to one of the controls being activated on the sending client:
obtaining event data from the sending client that identifies the data item associated with the activated control, wherein the data item is stored on at least one of the remote devices;
causing the data item to be included in an outgoing data stream that is transmitted to the receiving client over the IP telephony environment; wherein the data item comprises one or more of: a remote procedure that is executed on the receiving client and an electronic file,
wherein the control is an audio-based control that is activated when a keyword is identified in an audio stream received at the sending client; and
determining that the audio stream contains a command that identifies the data item that is associated with activation of the control from the sending client to send to the receiving client.

20. The system of claim 19, wherein the data item includes the remote procedure call and is configured to access functionality exposed by a programming interface on the receiving client comprising performing a specified action on the receiving client.

* * * * *